(12) United States Patent
Darby et al.

(10) Patent No.: US 6,824,602 B2
(45) Date of Patent: Nov. 30, 2004

(54) BLOCK PAVING SAND

(76) Inventors: Paul Andrew Darby, 3 Patterdale Way, Amblecote, Brierley Hill, West Midlands, DY5 3XJ (GB); John Thomas Liddy, 7 Belgrave Court, Bawtry, Doncaster, South Yorkshire DN10 6SA (GB)

( * ) Notice: Subject to any disclaimer, the term of this patent is extended or adjusted under 35 U.S.C. 154(b) by 0 days.

(21) Appl. No.: 10/231,838

(22) Filed: Aug. 30, 2002

(65) Prior Publication Data

US 2003/0088009 A1 May 8, 2003

(30) Foreign Application Priority Data

Nov. 2, 2001 (GB) .............................................. 0126344
Aug. 20, 2002 (GB) .............................................. 0219379

(51) Int. Cl.$^7$ ...................... C09D 101/00; C09D 1/28; C09D 9/06; C09D 23/04; C09D 23/20; C09D 25/04; C09D 31/04
(52) U.S. Cl. .............................. 106/287.34; 106/204.3; 106/15.05; 524/1; 524/539; 524/557; 524/563; 524/564; 524/575
(58) Field of Search ........................ 106/287.34, 204.3, 106/15.05; 524/539, 557, 563, 564, 575, 1

(56) References Cited

U.S. PATENT DOCUMENTS

| | | |
|---|---|---|
| 3,891,453 A | 6/1975 | Williams |
| 4,764,548 A | 8/1988 | Hoppe et al. |
| 4,820,754 A | 4/1989 | Negri et al. |
| 4,939,192 A | 7/1990 | T'Sas |
| 5,244,304 A | 9/1993 | Weill et al. |
| 5,334,243 A | 8/1994 | Hyman |

FOREIGN PATENT DOCUMENTS

| | | | |
|---|---|---|---|
| AU | 25629/84 | 9/1985 | ........... C08L/33/08 |
| DD | 240555 A1 | 11/1986 | ........... C09D/5/34 |
| DE | 325084 | 10/1957 | |
| DE | 4302138 A1 | 7/1993 | ............. E01C/3/00 |
| DE | 4421970 | 1/1995 | ........... C04B/26/02 |
| EP | 0199921 | 11/1986 | ........... C04B/26/04 |
| EP | 0936311 A2 | 8/1999 | ............. E01C/5/00 |
| GB | 714782 | 9/1954 | |
| GB | 1030018 | 5/1966 | ........... C08F/29/42 |
| GB | 2155944 A | 10/1985 | ............... C09J/3/00 |
| JP | 56159271 | 12/1981 | ........... C08L/31/04 |
| JP | 57151611 | 8/1982 | ........... C04B/25/04 |
| JP | 61254701 | 11/1986 | ............. E01C/7/30 |
| JP | 2285103 | 1/1990 | ........... E01C/11/06 |
| JP | 6101204 | 4/1994 | ........... E01C/11/00 |
| JP | 10265251 | 10/1998 | ........... C04B/28/02 |
| WO | WO 91/01951 | 2/1991 | ........... C04B/28/02 |
| WO | WO 97/07303 | 2/1997 | ........... E04F/21/20 |
| WO | WO98/44033 | 10/1998 | ............. C08L/9/00 |
| WO | WO 00/50355 | 8/2000 | ........... C04B/26/04 |

OTHER PUBLICATIONS

Chemical Abstracts, vol. 119, No. 8, Aug. 23, 1993, Columbus, Ohio, US Abstract No. 78628F, p. 404.

*Primary Examiner*—David Brunsman
(74) *Attorney, Agent, or Firm*—Wyatt, Tarrant & Combs, LLP

(57) ABSTRACT

An improved block paving sand comprising kiln dried sand mixed with a water-soluble polymer. The block paving sand is filled into gaps between blocks and then water is applied thereto. Upon contact with the water, the polymer coats the sand and then sets hard, thereby stabilising the block paving.

10 Claims, No Drawings

BLOCK PAVING SAND

CROSS REFERENCE TO RELATED APPLICATIONS

This application claims priority of UK patent application No. 0126344.1, filed Nov. 2, 2001, and UK patent application No. 0129379.5, filed Aug. 20, 2002.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to an improved sand for use in block paving applications, clay paviors, slabs and any other products in relation to the laying of paths, driveways, forecourts, patios and the like, or to any similar application where stability is required. Embodiments of the invention may also find utility for filling gaps between sections of runways and in various other heavy duty civil engineering applications.

2. General Background of the Invention

When laying block paving, for example as part of a road or driveway, it is known to fill the gaps between adjacent blocks with kiln dried sand so as to provide structural stability to the blocks. However, ordinary kiln dried sand has the disadvantage that it tends to disperse and disappear from between the blocks, especially during wet and windy weather or when the road or driveway is being swept, leaving gaps between the blocks. These gaps eventually result in structural instability, since the blocks then become free to move with respect to each other. Furthermore, the block paved road or driveway becomes unsightly, and weeds may grow in the gaps between the blocks. Indeed, ordinary kiln dried sand allows weeds to grow between the blocks even when the gaps are filled with the sand.

It is known to provide a polymeric sealant to block paved roads or driveways after laying, which can help to ameliorate these problems, but the application of sealant is time consuming and expensive.

It is also known, for example from U.S. Pat. No. 5,244,304, JP2285103 and JP 10265251, to provide a cementitious material including a polymer component for use in laying paving slabs and the like. These cementitious materials may be used as a base layer or as a jointing compound, but are disadvantageous in that once set, it is extremely difficult to clean up spillages and splashes which can cause staining of the paving slabs and the like. This is because cementitious materials tend to set permanently and cannot thereafter be removed without chipping or other physical force. These materials are also messy and unpleasant to apply, being in a paste-like cementitious form that is wholly unsuited as a jointing compound for block paving and the like.

Other jointing compounds known, for example, from DE 4421970, WO 00/50355 and WO 97/07303, use mixtures of liquid polybutadiene, a flow enhancer and dry particulate material such as sand, crushed glass or fine aggregate. These mixtures are advantageous in that they are relatively easy to handle and do not adhere to paving slabs or the like when spilled thereon. However, the mixtures are designed to set upon exposure to air or oxygen, which can make handling difficult and means that the mixtures require careful storage. Furthermore, flow enhancers generally contain environmentally-unfriendly organic solvents. It will be appreciated that polybutadiene is not a water-soluble polymer.

Finally, a coloured asphaltic paving material is known from JP 61254701. This material comprises a resin emulsion, quartz sand pigment, silica asphalt emulsion, a thickening agent and a defoaming agent. This material is used in a manner similar to ordinary asphalt, being spread in fluid form onto a surface (e.g. a tennis court) and allowed to set. It is wholly unsuitable for use as a jointing compound for block paving, being messy to apply and requiring heating.

SUMMARY OF THE INVENTION

According to a first aspect of the present invention, there is provided a non-cementitious, non-asphaltic material for filling gaps between paving blocks or the like, the material comprising dried sand or silicates mixed with a water-soluble polymer.

According to a second aspect of the present invention, there is provided a method of stabilising paving blocks or the like comprising a plurality of blocks laid adjacent to each other with gaps therebetween, wherein the gaps are filled with a non-cementitious, non-asphaltic material comprising dried sand or silicates mixed with a water-soluble polymer, and wherein water is applied to the material near upper surfaces of the blocks.

According to a third aspect of the present invention, there is provided a material for filling gaps between paving blocks or the like, each 106.5 kg of the material comprising: 100 kg kiln dried sand; 5 kg powdered vinyl acetate/versatate copolymer with kaolin filler and polyvinyl alcohol colloid protector; 0.5 kg herbicide/fungicide and 1 kg crystalline sodium silicate.

BRIEF DESCRIPTION OF THE DRAWINGS

There are no drawings submitted.

DETAILED DESCRIPTION OF THE PREFERRED EMBODIMENTS

For the avoidance of doubt, the expression "paving blocks or the like" in the context of the present application may encompass block paved roads or driveways or the like, clay paviors, slabs and any other products in relation to the laying of paths, driveways, forecourts (including petrol/gasoline station forecourts), patios, airport runways, roads and other civil engineering applications.

Preferably, the present invention is directed to a filler for use in block paving applications and the like, including a sand and a binder material, wherein the components for the material includes at least 3% by weight water-soluble polymer, and will generally include from 3% to 25% by weight water-soluble polymer. In a particularly preferred embodiment, the material includes from 4% to 10% by weight water-soluble polymer.

The dried sand or silicates may be kiln dried, and the water-soluble polymer is preferably dispersed throughout the dried sand or silicates as a fine powdered or granulated formulation.

The provision of a water-soluble polymer component in the material means that the application of water to the material once it has been filled into the gaps between adjacent blocks will tend to dissolve at least a part of the polymer component. The polymer solution will then tend to coat the sand or silicate particles, causing them to adhere to each other upon drying. Indeed, the water-soluble polymer is preferably chosen so as to cause the material to set solid after being wetted and subsequently dried. Water may be applied by way of a hosepipe or the like, or by way of natural rainfall. The water-soluble polymer component advantageously comprises grains or particles coated with a solubilising agent which, upon contact with water, enhances the solubility of the polymer component in the water. Because the solubilising agent will tend gradually to be washed away from exposed regions of the material subject to repeated rainfall or wetting, the set polymer component in these regions will tend to be relatively insoluble and thus will remain relatively stable, becoming more and more so over time. However, a degree of elastomeric flexibility is retained so as to allow for thermal expansion and mechanical deformation due to heavy vehicles passing over the block paving, and any cracks or defects in the material once laid will tend to be self-healing upon subsequent rainfall or wetting.

Generally, the polymer will only be dissolved in regions close to the tops of the gaps between adjacent blocks where water can penetrate, thereby causing the material to set solid only at and close to the tops of the gaps. This provides room for thermal expansion and contraction of the blocks below the surface of the block paving. Furthermore, as the top surface of the material is eroded through natural causes, further rainfall or the like will tend to cause newly-exposed areas of the material to harden, thereby extending the life of the block paving.

It is preferred that the polymer is only partially soluble in water under conditions of normal rainfall or application of water through a hosepipe or the like, thereby helping to prevent the material from setting solid below the exposed surfaces.

For the avoidance of doubt, it is emphasised that the material of embodiments of the present invention is non-cementitious (i.e. does not contain any cement or cement-like components), and non-asphaltic (i.e does not contain asphalt or asphalt-like components). The material is preferably applied in a dry powdered or particulate form, and may thus easily be swept or otherwise applied into interstitial gaps in block paved surfaces or the like. Because the material does not set until water is applied and can safely be exposed to air or oxygen without setting, it is easy to store and handle. Furthermore, even once set, materials of embodiments of the present invention can be resolvated simply through the addition of water, allowing spillages and the like to be cleaned away with relative ease.

Polymers suitable for use with the present invention include polyvinyl family polymers such as vinyl acetate polymer and vinyl acetate/versatate copolymer (for example that sold under the trade names of RHOXIMAT® PAV 33 or RHOXIMAT® PAV 43), styrene maleic anhydride, styrene butadiene copolymer (with an optional kaolin filler, for example as sold under the trade name of RHOXIMAT® PSB 150), hydroxymethyl cellulose, hydroxyethyl cellulose, 2-butenedioic acid polymer and methoxyethene polymer. It will be appreciated that other water-soluble polymers may be effective. The polymer component is preferably mixed in with the other components as a powdered or granulated formulation.

In addition to dried sand or silicates and water-soluble polymer, the material of the present invention may include herbicide and/or fungicide (for example ACTICIDE® EP powder), powdered silicates (for example sodium silicate) and/or one or more colorants or dyes.

A particularly preferred formulation for the material of the present invention is made up in the following relative proportions: 100 kg kiln dried sand; 5 kg powdered vinyl acetate/versatate copolymer with kaolin filler and polyvinyl alcohol colloid protector; 0.5 kg herbicide/fungicide; 1 kg crystalline sodium silicate.

It is to be noted that the present invention is suitable not just for block paving applications, but for any application where blocks or slabs or the like are laid and require interstitial stabilisation.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps.

What is claimed is:

1. A method of using a non-cementitious, non-asphaltic material comprising a water-soluble polymer and at least one of a dry sand and silicate, the method comprising the steps of:

a. disposing the material in contact with a paving block, wherein the material is substantially dry during the disposing step; and b. increasing a moisture content of the material after the disposing step.

2. A method as claimed in claim 1, wherein the material comprises from 3% to 25% by weight water-soluble polymer.

3. A method as claimed in claim 1, wherein the material comprises from 4% to 10% by weight water-soluble polymer.

4. A method as claimed in claim 1, wherein the water-soluble polymer of the material comprises at least one of a polyvinyl family polymer, a vinyl acetate/versatate copolymer, and a vinyl acetate polymer.

5. A method as claimed in claim 1, wherein the water-soluble polymer of the material is selected from a group consisting of styrene maleic anhydride, hydroxymethyl cellulose, hydroxyethyl cellulose, 2-butenedioic acid polymer, methoxyethene polymer, styrene butadiene copolymer, and combinations thereof.

6. A method as claimed in claim 1, wherein the material comprises at least one of a herbicide and a fungicide.

7. A method as claimed in claim 1, wherein the material comprises sodium silicate in at least one of a powdered and a crystalline form.

8. A method as claimed in claim 1, wherein the increasing step comprises contacting the material with water.

9. A method as claimed in claim 8, wherein the contacting the material step comprises only a portion of the material with water.

10. A material for filling gaps between paving blocks or the like, each 106.5 kg of the material comprising: 100 kg kiln dried sand; 5 kg powdered vinyl acetate/versatate copolymer with kaolin filler and polyvinyl alcohol colloid protector; 0.5 kg herbicide/fungicide and 1 kg crystalline sodium silicate.

* * * * *